United States Patent [19]

Craig

[11] Patent Number: 4,556,986
[45] Date of Patent: Dec. 3, 1985

[54] OPTICAL STEREO VIDEO SIGNAL PROCESSOR

[75] Inventor: Glenn D. Craig, Huntsville, Ala.

[73] Assignee: The United States of America as represented by the Administrator of the National Aeronautics and Space Administration, Washington, D.C.

[21] Appl. No.: 473,499

[22] Filed: Mar. 9, 1983

[51] Int. Cl.$^4$ .......................... G06K 9/00; H04N 7/18
[52] U.S. Cl. .................................. 382/42; 350/335; 356/4.5; 356/345; 358/88; 358/105; 358/125; 364/822
[58] Field of Search ................ 350/384, 385, 386, 335, 350/3.67, 162.13, 162.14, 130; 356/4.5, 10, 356, 4, 5, 12, 373, 375, 345; 358/125, 2, 3, 105, 88, 90; 382/42; 364/822

[56] References Cited

U.S. PATENT DOCUMENTS

| | | |
|---|---|---|
| 3,961,851 | 6/1976 | Gerharz .................................. 356/4 |
| 4,357,676 | 11/1982 | Brown ............................ 350/162.14 |
| 4,409,661 | 10/1983 | Romanski ............................ 358/125 |
| 4,462,046 | 7/1984 | Spight ............................ 350/162.13 |

Primary Examiner—Leo H. Boudreau
Attorney, Agent, or Firm—Joseph H. Beumer; John R. Manning; Leon D. Wofford, Jr.

[57] ABSTRACT

An optical video signal processor which produces a two-dimensional cross-correlation in real time of images received by a stereo camera system. The optical image of each camera (12, 14) is projected on respective liquid crystal light valves (28, 48). The images on the liquid crystal valves (28, 48) modulate light produced by an extended light source (32). This modulated light output becomes the two-dimensional cross-correlation when focused onto a video detector (42) and is a function of the range of a target (1) with respect to the stereo camera (10). Alternate embodiments utilize the two-dimensional cross-correlation to determine target movement and target identification.

23 Claims, 5 Drawing Figures

OPTICAL STEREO VIDEO SIGNAL PROCESSOR

ORIGIN OF THE INVENTION

The invention described herein was made by an employee of the United States Government and may be manufactured and used by or for the Government of the United States of America for Governmental purposes without the payment of royalties thereon or therefor.

BACKGROUND OF THE INVENTION

1. Field of the Invention

This invention relates to apparatus for determining target parameters such as range, motion, and identification using stereo correlation techniques.

2. Description of the Prior Art

Real time cross-correlation techniques for determining target range, motion, and identification have conventionally utilized digital computer techniques and coherent laser optical processing techniques. A chief disadvantage in such techniques is the cost and complexity of the hardware necessary to perform the cross-correlation calculations. Additionally, the speed with which digital processing techniques are carried out limits the ability of conventional hardware to produce results in real time. In addition, coherent laser optical processing systems have stability and size problems.

U.S. Pat. No. 4,270,143 issued to MORRIS discloses a cross-correlation video tracker wherein elements from one frame of an incoming video signal are stored to establish a reference image which is compared to an updated image derived from a subsequent frame of a video signal to generate an error signal. The signal derived is indicative of the direction and distance of movement of an object between successive video frames.

U.S. Pat. No. 3,527,880 issued to GORDON illustrates a stereo-optical observation arrangement wherein the image from a television camera is recorded on magnetic tape which provides for playback at a variable delay time. The delayed image is obtained by splitting the telescopic optical image beam provided by a telescope, one part of the beam being viewed by a first eye, and the second part being viewed by a television camera. The output of the television camera is recorded on the magnetic tape to produce a video output signal which is delayed with respect to the first video output signal.

U.S. Pat. No. 3,890,462 issued to LIMB et al. describes apparatus for measuring the speed and direction of movement of an object between two video frames employing only the video signal. This arrangement employs delay circuits and subtractors which provide first and second differential signals. The first differential signal is indicative of the intensity difference between each picture element of a present video frame and the corresponding picture elements of a previous video frame. The second differential signal represents a combination of the differences between proximate picture elements of the present and previous video frames. The signals are combined and converted into a single signal indicative of the total translation of a subject between two video frames.

U.S. Pat. No. 3,836,710 issued to TAKAHASHI illustrates a pattern discrimination system for use with a television, wherein each piece of information derived from a pattern under surveillance is compared with information of a pattern stored in a digital memory to provide rapid and automatic pattern discrimination.

However, none of the prior art techniques is easily adaptable to the real-time determination of target range, motion and identification. It is therefore an object of the present invention to provide a new and improved apparatus for stereo correlation techniques which overcomes the deficiencies of the prior art by utilizing current state-of-the-art components.

SUMMARY OF THE INVENTION

A stereo correlator, in accordance with the present invention, comprises a stereo TV camera having a pair of stereo cameras or pick-up tubes that produce a stereo-pair of video images of a scene containing a target, and a pair of cathode-ray tubes (CRTs) on which respective ones of the video images are displayed. The correlator also includes first and second liquid crystal light valves having input planes which receive light from the respective CRTs, and first and second polarization selective beam-splitters for receiving light from the output planes of the respective light valves. Finally, the correlator includes a source of polarized light that is incident on one of the beam-splitters which is effective to reflect light from the source and from the output plane of one of the light valves through the other of the beam-splitters and onto the output plane of the other light valve.

Light from the last-mentioned output plant is split by the other of the beam-splitters and reflected into a lens that focuses the light onto a video detector, the output of which is a signal that is a measure of the two-dimensional cross-correlation of the stereo images generated by the CRTs and the television camera. By extracting parallax data from the correlation data, a representation of target range is obtained. Parallax data are extracted by computing the peak signal location in the video frame produced by the video detector.

In a second embodiment, an image stored in a video memory is applied to one of the CRTs to establish a reference image while a target is imaged by the pickup tube driving the other CRT to establish a real time image that is compared with the reference image. Any subsequent movement of the target will result in a shift of the central correlation peak and provide tracking information. Alternatively, the first camera signal may be correlated with a signal generated by an external video playback system so that the input image from the camera is repetitively correlated with successive images generated by the video playback system on a trial and fit basis, thereby providing target identification capabilities.

Additionally, a geometric mask generated by a computer, and stored in a frame memory, may be displayed by the second CRT. By proper choice of this generated function, a two-dimensional transform of the camera signal is generated at the output sensor.

Yet another embodiment would utilize a compact optical design employing Fresnel lenses. Furthermore, a polarization beam splitter could serve as the selective reflector for both liquid crystal valves. Additionally, a laser disc playback unit, controlled by a computer, can be employed for target identification applications to thereby provide a library of images, the images being catalogued on a laser video disc.

The optical stereo video signal processor described in this application can have utility in line of sight tracking situations. In particular, this invention can be used by the space shuttle or other orbiting aircraft in various maneuvers, such as docking. The optical correlator would be used to gauge distance in docking operations, as well as to identify the correct port which must be docked.

BRIEF DESCRIPTION OF THE DRAWINGS

Embodiments of the present invention are described by way of example with reference to the accompanying drawings wherein like reference characters refer to like parts throughout and in which.

DETAILED DESCRIPTION OF THE INVENTION

The present invention constitutes a relatively simple and adaptable optical configuration whereby optical correlation data is calculated at the velocity of light for two-dimensional data arrays whereby the correlation is therefore available in real time.

Figure 1:
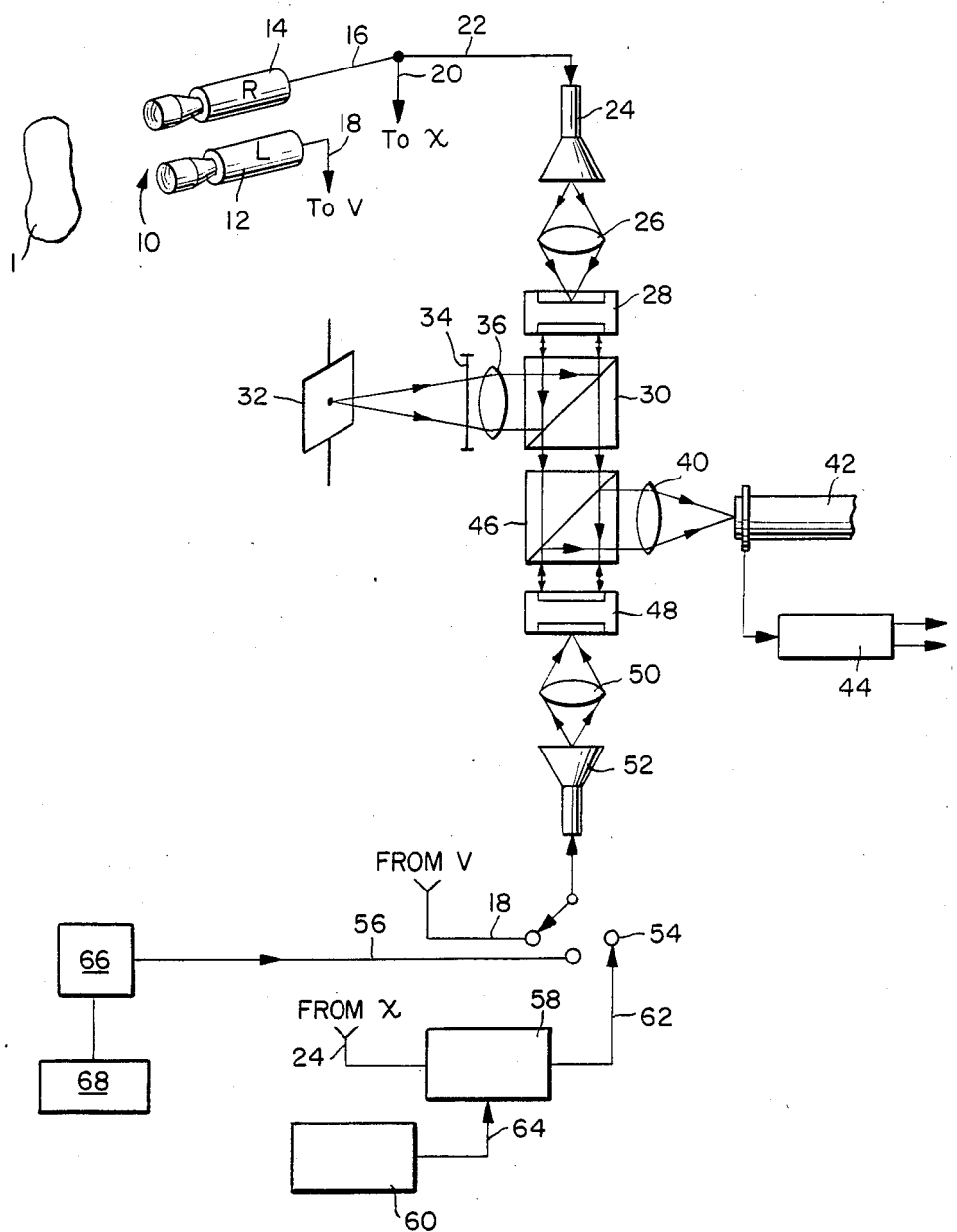
FIG. 1 is a schematic drawing of one embodiment of the optical stereo video signal processor according to the present invention.

FIG. 1 illustrates a preferred embodiment of the optical stereo video signal processor which utilizes a monochrome stereo television camera pair 10 consisting of a left camera 12 and a right camera 14. Video information of target 1 is received by right camera 14 is transmitted over standard transmitting means 16 and 22 to a cathode-ray tube 24. The information sensed by the left stereo camera 12 is transmitted over similar lines 18 to cathode-ray tube 52.

A video switch 54 is included to provide several input sources to the screen of cathode-ray tube 52. As shown in FIG. 1, the signal generated by the left stereo camera 12 is transmitted to the cathode-ray tube 52. Other operating modes produced by the switch 54 in various positions will be discussed hereinbelow.

A diffuse, extended, distributed light source 32, such as may be supplied by a laser, tungsten filament, or an arc lamp is provided and the light emitted from this source is directed through a linear polarizer 34, and collected and collimated by a convex lens 36. The polarizer is commercially known and a typical material which could be utilized is type HN-38 or HN-42 produced by the Polaroid Corporation.

The collimated light is directed to a polarization-selective beam splitter 30 which reflects the light onto the output plane of a liquid crystal light valve 28. Simultaneously, the information provided upon the face of the cathode-ray tube 24 is collimated by a convex lens 26 and is presented to the input plane of the light valve 28. Similarly, the information displayed on the face of cathode-ray tube 52 is collected and collimated by a concave lens 50 and is reflected onto the input plane of a liquid crystal light valve 48. The particular light valve which is utilized is produced by Hughes Research Laboratories and is described in a paper reprinted from the International Electron Devices Meeting, Dec. 1979 (appearing at pages 540–542). Additionally, the light collimated by the convex lens 36 and passing through the polarization-selective beam splitter 30 is then directed to a polarization-selective beam splitter 46 and onto the output plane of the liquid crystal light valve 48. The beams of light projected onto the output planes of the liquid crystal light valves 28 and 48 are modulated by the beams projected onto the input planes of the light valves 28 and 48. Thereafter, the light beam reflected onto the output plane of the liquid crystal light valve 28 is proportional to the optical image impressed upon the input plane of the light valve 28 and is then selectively reflected back through the beam splitter 30 to the beam splitter 46. Similarly the light beam which is modulated by the liquid crystal valve 48 is selectively reflected through beam splitter 46. This beam is then focused by a convex lens 40 onto a plane at the input of a standard video detector 42, whereby the two-dimensioal cross-correlation function of the images generated on the cathode-ray tubes 24 and 52 is generated at real time at the input of the video detector 42.

With the video switch 54 positioned as shown in FIG. 1, the optical stereo video signal processor of the present invention operates to produce target range information on the video detector 42. If the target is at a particular optimum range, a peak correlation signal would be produced at the center of the video detector 42 in conjunction with peak tracking electronics 44. The positioning of the signal on the video detector is determinative of the target range. Therefore, if the target is closer or further from this predetermined position, the position of the signal produced upon the video detector would move from the center position to a position which is indicative of the target range.

If the video switch is switched to a second mode whereby information produced by the right video camera 14 is transmitted through transmission lines 16 and 20, the invention can determine whether the target has moved with respect to the camera. In this mode, the image produced by the right camera 14 is transmitted to a video frame memory 58 where it is stored. The cathode-ray tube 52 is then driven by the signal stored in the memory 58 and transmitted to the cathode-ray tube 52 via transmission line 62 and is compared to the image presently produced by the right camera 14. Since a real time image is now compared with a reference frame of the same view, any subsequent movement of the target will result in a shift of the central correlation peak and be sensed as tracking information by the detector 42 and the tracking electronics 44. Obviously, while FIG. 1 indicates that the information produced by the right camera 14 is compared to a previous frame produced by this camera, the invention will operate with equal facility utilizing only the left camera 12.

In a third mode, with the video switch 54 connected to transmission line 56, the signal produced by the right camera 14 is correlated with a signal generated by an external video playback system. In this mode, an input image generated from the right camera 14 is repetitively correlated with successive images generated by a laser disc playback unit 66 controlled by a computer 68. The computer senses the resultant correlation signal produced on the display of video detector 42. The laser disc is programmed to play selective images which are correlated with an unknown target 1 in a trial and fit basis.

This process proceeds by a computer algorithm which progressively matches a reference image from the disc with the unknown image on the basis of area, spatial extent and orientation. This comparison proceeds until a sufficient match has occurred, when it is then presumed that the unknown target has been sufficiently classified to be considered identified.

Figure 3:
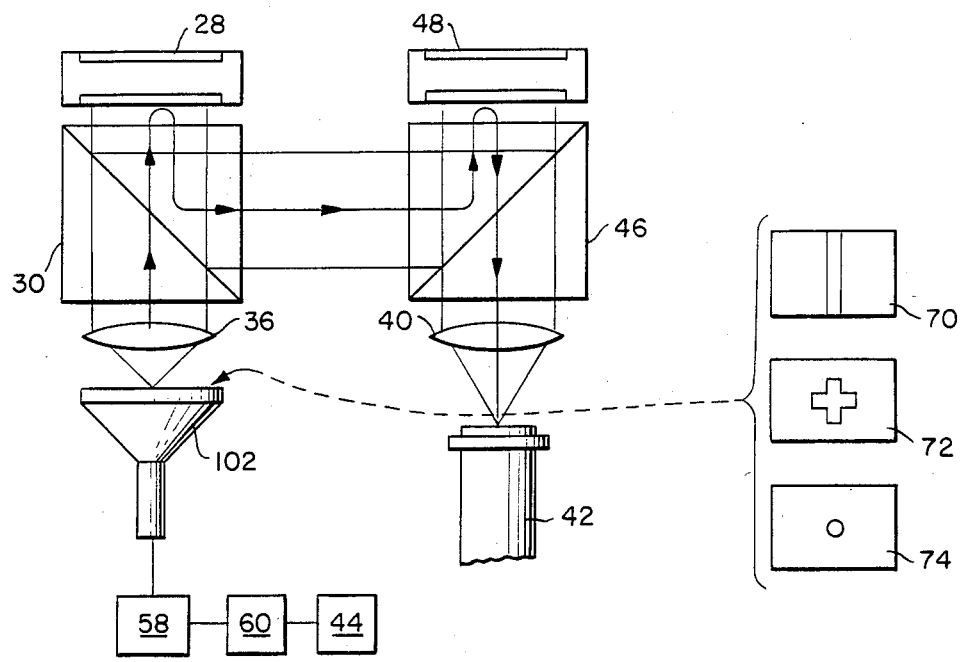
FIG. 3 is an optical schematic drawing of an alternative embodiment of the optical stereo video signal processor.

In a fourth mode, as shown in FIG. 3, the video switch connects the video frame memory 58 with the cathode-ray tube 102. Various geometric masks generated by a microprocessor 60 are stored in the video memory 58 and displayed upon the cathode-ray tube 102. These masks could include a straight line function 70, a cross-hair function 72 and a dot function 74. By proper choice of this generated function, a two-dimensional transform of the camera signal is generated at the video detector 42. In this manner, the mask is positioned in response to the correlation peak which in turn can produce a more vividly displayed signal peak.

Figure 2:
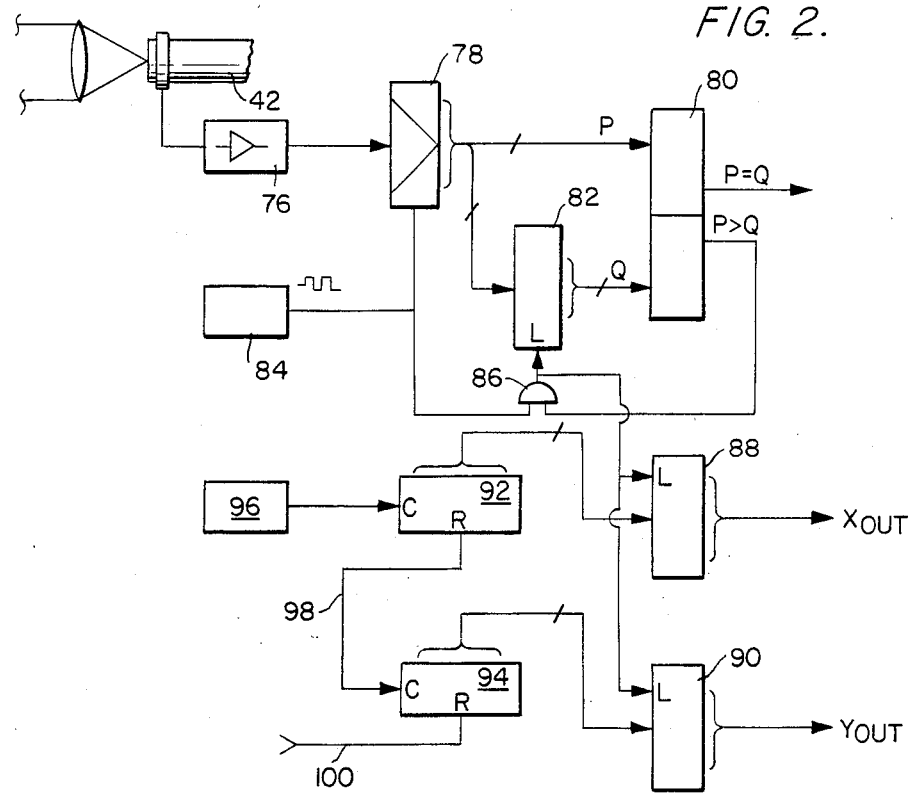
FIG. 2 is a schematic circuit diagram of the tracking electronics utilized in the optical stereo video processor.

FIG. 2 is directed to the peak tracking electronics 44 used to provide an indication of the occurrence and location of the peak optical signal impinging upon the video detector 42. The signal produced by the detector 42 is amplified by an electronic amplifier 76 which is then introduced into a standard video analog to digital (A/D) converter 78. The converted digital signal is transmitted to a digital comparator 80 and a digital latch 82. A clock oscillator 84 is utilized to provide the proper clock signals to the A/D converter 78. If a current value P is greater than a previously stored value Q, the current signal value is loaded into the digital latch 82 utilizing a NAND logic gate 86. This comparison also causes the address values present in a horizontal position counter 92 and a vertical position counter 94 to be stored in the horizontal digital latch 88 and the vertical digital latch 90 respectively. A clock oscillator 96 and a horizontal synchronization pulse 98 are used to increment the horizontal digital counter 92. The horizontal synchronization pulse 98 as well as a vertical synchronization pulse 100 are used to increment the vertical digital counter 94. However, if the current signal P is equal or less than the previously stored signal Q, the current value P is not stored.

This process is repeated for each position in the video frame, and at the end of the frame scan, the value contained in the horizontal position latch 88 and the vertical position latch 90 represent the peak signal location in the video frame. This signal is stored in the peak tracking electronics. At the end of the frame, the circuitry is reset and the comparison process is repeated on the next subsequent video frame.

FIG. 3 illustrates an alternate embodiment of the present invention in which a cathode-ray tube 102 is used in place of the extended light source 32. Additionally, this embodiment can utilize the geometric mask described with respect to the fourth mode of FIG. 1. The principal virtue of this technique is the capability of producing an aperture function by selectively programming the various image functions 70, 72 and 74 on the cathode-ray tube 102 which is connected to the video frame memory 58 operated by the microprocessor 60. The image forms are then positioned with response to the correlation peak generated on the video detector 42 and produced by the peak tracking electronics 44. In this manner, the correlation function normally generated, may be masked by the aperture function generated at the cathode-ray tube.

Figure 4:
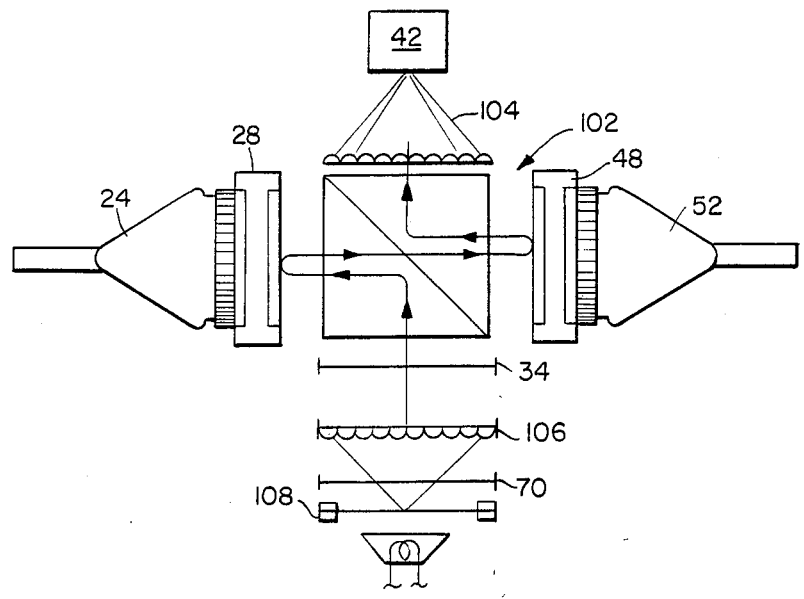
FIG. 4 is an optical schematic drawing of another alternate embodiment of the optical stereo video signal processor using a single prism design.

FIG. 4 illustrates an alternate embodiment of the present invention whereby a single polarization selective beam splitter 102 is utilized instead of the two beam splitters described in FIG. 1. Additionally, Fresnel lenses 104 and 106 can be employed instead of lenses 36 and 40 respectively to provide for a much more compact design. Furthermore, convex lens 26 can be eliminated if the cathode-ray tube 24 directly abuts the light valve 28. Similarly, the convex lens 50 can be eliminated if cathode-ray tube 52 directly abuts the light valve 48 and fiber-optic-coupled devices are used.

By the proper orientation of the polarization-selective beam splitter 102, and the orientation of the polarization axes of the liquid crystal light valves 28 and 48, the path of light through the correlator traverses the path as shown.

Figure 5:
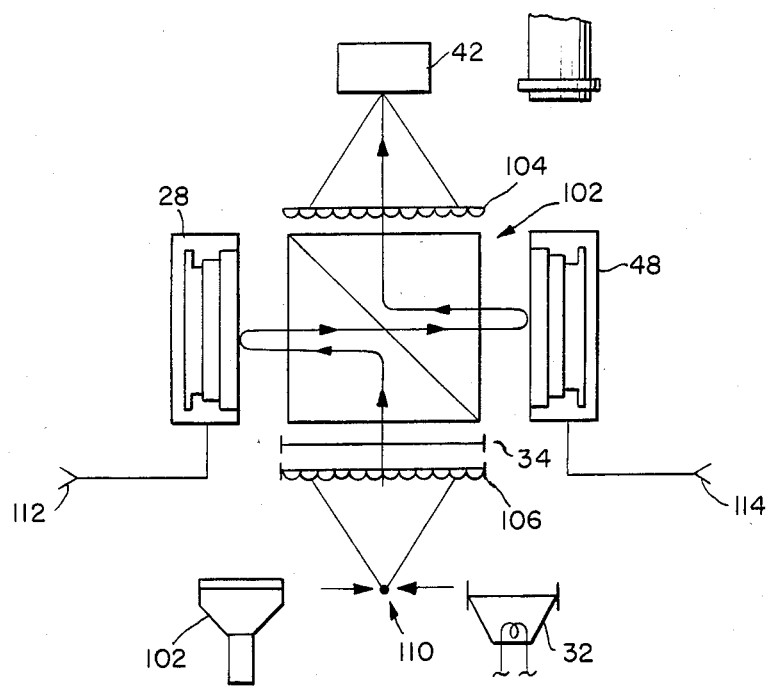
FIG. 5 is an optical schematic diagram of the optical stereo video signal processor showing an alternate embodiment utilizing a charge couple device addressed light valve.

FIG. 5 shows an alternate embodiment whereby the light valves 28 and 48 are electrically addressed by signals 112 and 114 respectively and are caused to form a representative image, by a charge coupled silicon device. This figure indicates that a single beam splitter 102 is utilized. However, it should be appreciated that the light valves could produce an image utilizing the two beam splitters illustrated in FIG. 1. Additionally, FIG. 5 indicates that either the cathode-ray tube 102 shown in FIG. 3 or the extended light source 32 illustrated in FIG. 1 can be utilized to produce an image plane directed at point 110. Furthermore, this figure indicates that Fresnel lenses 104 and 106 are used. However, it should be noted that the lens configuration shown in FIG. 1 could also be employed.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A method for obtaining parallax data, such as the range of a particular target, including the steps of:
    (a) producing first and second representations of the target, the first representation being slightly offset from said second representation;
    (b) displaying said first and second representations of the target, on respective first and second displays;
    (c) directing a polarized and collimated beam of light at the output planes of a first liquid crystal light valve and a second liquid crystal light valve;
    (d) directing the information provided on the face of said first display to the input plane of said first liquid crystal light valve and the information provided on the face of said second display to the input plane of a second liquid crystal light valve, said present step being performed simultaneously with directing the polarized and collimated beam of light at the output planes of said first and second liquid crystal light valve;
    (e) superimposing the images produced on the output planes of said first and second liquid crystal light valves on a video detector, wherein the images produced on the output planes of said first and second liquid crystal light valves are proportional to the images impressed on the input planes of said first and second liquid crystal light valves; and
    (f) producing a peak correlation signal on said video detector, said peak correlation signal being indicative of the range of the target.

2. The method in accordance with claim 1 wherein said first and second representations are produced by first and second video cameras.

3. The method in accordance with claim 1 wherein said first and second representations are produced by charge coupled silicon devices.

4. A method for determining tracking information for a particular target, including the steps of:
 (a) producing a first and second representation of the target, the first representation being slightly offset from said second representation;
 (b) storing either said first or said second representation of said target in a storage device and continuously providing the other representation;
 (c) displaying said stored representation and said continuously provided representation on respective first and second displays;
 (d) directing a polarized and collimated beam of light at the output planes of a first liquid crystal light valve and a second liquid crystal light valve;
 (e) directing the information provided on the face of said first display to the input plane of said first liquid crystal light valve and the information provided on the face of said second display to the input plane of a second liquid crystal light valve, said present step being performed simultaneously with directing the polarized and collimated beam of light at the output planes of said first and second liquid crystal light valve;
 (f) superimposing the images produced on the output planes of said first and second liquid crystal light valves on a video detector, wherein the images produced on the output planes of said first and second liquid crystal light valves are proportional to the images impressed on the input planes of said first and second liquid crystal light valves;
 (g) producing a peak correlation signal on said video detector, whereby any movement of said peak correlation signal indicates movement of the target, the movement of said signal on said video detector being proportional to the actual movement of the target.

5. The method in accordance with claim 4 wherein said first and second representations are produced by first and second video cameras.

6. The method in accordance with claim 4 wherein said first and second representations are produced by charge coupled silicon devices.

7. A method for identifying a particular unknown target, including the steps of:
 (a) providing a plurality of possible target images in a video playback system;
 (b) producing a representation of the unknown target;
 (c) displaying said representation of the unknown target and one of the possible target images included in said video playback system on respective first and second displays;
 (d) directing a polarized and collimated beam of light at the output planes of a first liquid crystal light valve and a second liquid crystal light valve;
 (e) directing the information provided on the face of said first display to the input plane of said first liquid crystal light valve and the information provided on the face of said second display to the input plane of a second liquid crystal light valve, said present step being performed simultaneously with directing the polarized and collimated beam of light at the output planes of said first and second liquid crystal light valve;
 (f) superimposing the images produced on the output planes of said first and second liquid crystal light valves on a video detector, wherein the images produced on the output planes of said first and second liquid crystal light valves are proportional to the images impressed on the input planes of said first and second liquid crystal light valves; and
 (g) repetitively correlating the representation of the unknown target with successive images provided on said video playback system in a trial and fit basis until the unknown target has been sufficiently classified.

8. An optical stereo video signal processor comprising:
 (a) a stereo camera system including first and second video cameras;
 (b) first display means in communication with said first video camera, and second display means in communication with said second video camera for producing an optical representation of an image detected from its respective video camera;
 (c) a first liquid crystal light valve in optical communication with said first display means, and a second liquid crystal light valve in optical communication with said second display means, each of said first and second liquid crystal light valves including an input plane directed at its respective first and second display means and each of said first and second liquid crystal light valves including an output plane;
 (d) beam splitter means provided between said first and second liquid crystal light valves for providing selective reflection of light, the output planes of each of said first and second liquid crystal light valves directed at said beam splitter means;
 (e) a light source in optical communication with said beam splitter means; and
 (f) a video detector in optical communication with said beam splitter,
 whereby the light produced by said light source is modulated by the light provided on the input planes of said first and second liquid crystal light valves and produces a two-dimensional cross-correlation function on said video detector.

9. An optical stereo video signal processor in accordance with claim 8 further including a peak electronic tracking means in electrical communication with said video detector for producing an electrical signal indicating the location of a peak correlation signal on said video detector.

10. An optical stereo video signal processor in accordance with claim 9 wherein said beam splitter means includes two beam splitters.

11. An optical stereo video signal processor in accordance with claim 8 further including a microprocessor for generating masks on said second display means, and a video frame memory in communication with said first video camera for storing frames generated by said first video camera to be produced on said second means, said microprocessor controlling the operation of said video frame memory.

12. An optical stereo video signal processor in accordance with claim 8 further including a video playback system and a computer, said video playback system controlled by said computer and connected to said second display means, whereby images transmitted to said second display means are optically correlated with images provided on said first display means provided by said first video camera for purposes of image identification.

13. An optical stereo video signal processor in accordance with claim 8 wherein said first and second display means directly abuts said first and second liquid crystal light valves, respectively.

14. An optical stereo video signal processor in accordance with claim 8 further including collimating lenses between said first display means and said first liquid crystal light valve, between said second display means and said second liquid crystal light valve, between said light source and said beam splitter, and between said beam splitter and said video detector.

15. An optical stereo video signal processor in accordance with claim 14 wherein said collimating lenses are convex lenses.

16. An optical stereo video signal processor in accordance with claim 14 wherein said collimating lenses are Fresnel lenses.

17. An optical stereo video signal processor comprising:
 (a) a stereo camera system including first and second video cameras;
 (b) first display means in communication with said first video camera and second display means in communication with said second video camera for producing an optical representation of an image detected from its respective video camera;
 (c) a first charge coupled silicon device in communication with said first display means, and a second charge coupled silicon device in communication with said second display means;
 (d) beam splitter means provided between said first and second charge coupled silicon devices for providing selective reflection of light;
 (e) a light source in optical communication with said beam splitter; and
 (f) a video detector in optical communication with said beam splitter,
 whereby the light produced by said light source is modulated by said first and second charge coupled silicon devices and produces a two-dimensional cross-correlation function on said video detector.

18. An optical stereo video signal processor in accordance with claim 17 further including a peak electronic tracking means in electrical communication with said video detector for producing an electrical signal indicating the location of a peak correlation signal on said video detector.

19. An optical stereo video signal processor in accordance with claim 18 wherein said beam splitter means includes two beam splitters.

20. An optical stereo video signal processor in accordance with claim 17 further including a microprocessor for generating masks on said second display means and a video frame memory in communication with said first video camera for storing frames generated by said first video camera to be produced on said second means, said microprocessor controlling the operation of said video frame memory.

21. An optical stereo video signal processor in accordance with claim 17 further including a video playback system and a computer, said video playback system controlled by said computer and connected to said second display means, whereby images transmitted to said second display means are optically correlated with images provided on said first display means provided by said first video camera for purposes of image identification.

22. An optical stereo video signal processor in accordance with claim 17 further including collimating lenses between said light source and said beam splitter and between said beam splitter and said video detector.

23. An optical stereo video signal processor in accordance with claim 22 wherein said collimating lenses are Fresnel lenses.

* * * * *